United States Patent [19]

Jensen

[11] Patent Number: 4,823,927

[45] Date of Patent: Apr. 25, 1989

[54] RETRACTABLE ROLLER SYSTEM FOR CARGO HANDLING

[75] Inventor: Richard H. Jensen, Torrance, Calif.

[73] Assignee: Ancra Corporation, Hawthorne, Calif.

[21] Appl. No.: 89,358

[22] Filed: Aug. 24, 1987

[51] Int. Cl.$^4$ ............................................. B65G 13/00
[52] U.S. Cl. ................................................. 193/35 SS
[58] Field of Search .................... 193/35 SS, 35 R; 198/781, 782; 414/531, 532, 535

[56] References Cited

U.S. PATENT DOCUMENTS

| | | | |
|---|---|---|---|
| 4,089,399 | 5/1978 | Webb | 414/529 X |
| 4,205,740 | 6/1980 | Hammond | 193/35 SS X |
| 4,258,766 | 3/1981 | van Dijk | 193/35 SS X |
| 4,462,493 | 7/1984 | Nordstrom | 414/532 X |
| 4,498,384 | 2/1985 | Murphy | 193/35 SS X |

FOREIGN PATENT DOCUMENTS

| | | | |
|---|---|---|---|
| 120181 | 9/1979 | Japan | 414/535 |
| 2142892 | 1/1985 | United Kingdom | 193/35 SS |

*Primary Examiner*—Robert J. Spar
*Assistant Examiner*—Cheryl L. Gastineau
*Attorney, Agent, or Firm*—Edward A. Sokolski

[57] ABSTRACT

A retractable roller system for handling cargo has a main channel which is mounted on the floor of a vehicle into which cargo is to be loaded. a pneumatically actuated bladder is mounted along the bottom of the channel and a roller tray on which a plurality of roller members are rotatably supported is mounted in the channel above the bladder. Extending outwardly from each of the opposing side walls of the roller tray is a flange member, the flange member of one of the walls being at a lower level therealong than the flange member of the opposing wall. Extending inwardly from each of the side walls of the main channel is a flange member, the flange member of one of the channel walls being at a lower level therealong than the flange member of the other channel wall. The roller tray is mounted in the main channel such that the side thereof on which this flange is at a lower level is opposite the side of the channel with the lower level flange with the side of the roller tray and main channel having the higher positioned flanges being opposite each other. The rollers are raised and lowered by inflating and deflating the bladder. With the bladder deflated, the roller tray moves downwardly to recess the rollers below the level of a removable cover plate. In such a lowered position, with the cover plate removed, the roller tray can be readily removed from the channel by sidewise tilting which permits the side flanges of the roller tray to clear the side flanges of the channel.

4 Claims, 2 Drawing Sheets

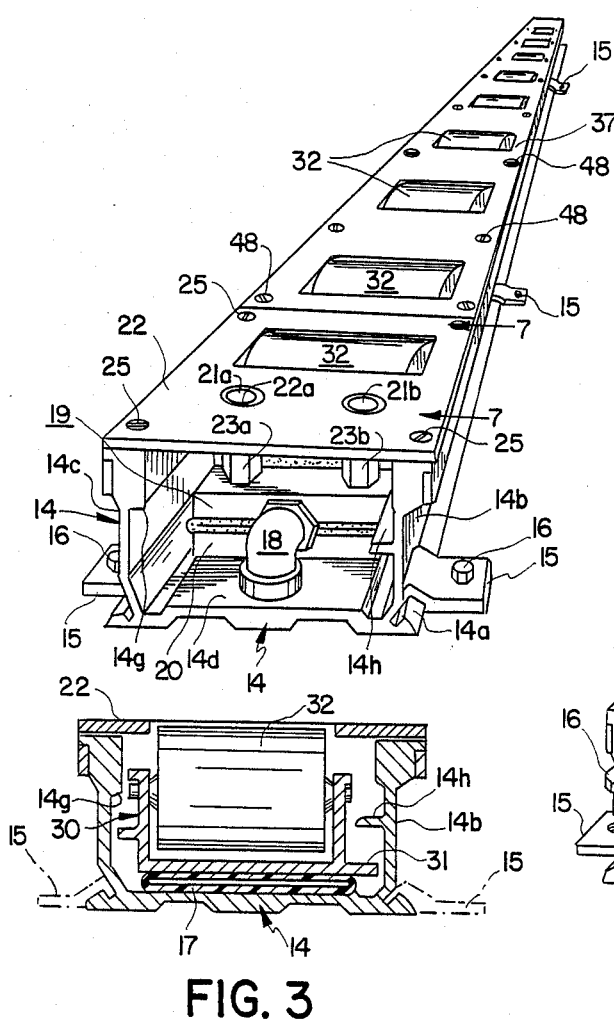
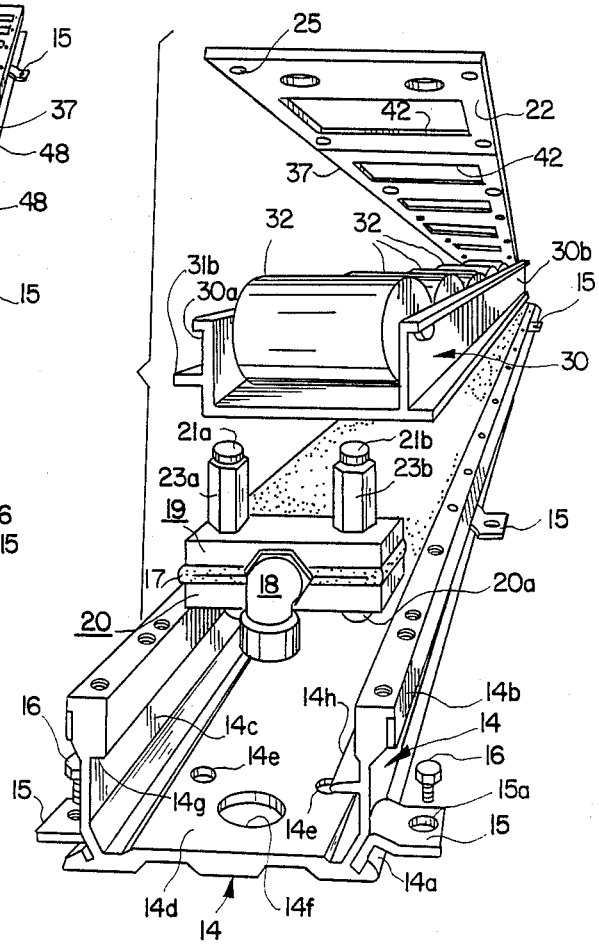
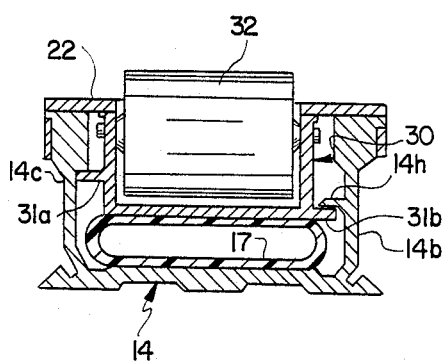
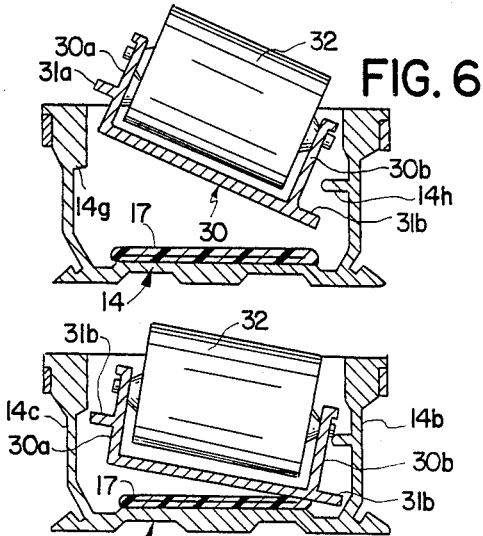

RETRACTABLE ROLLER SYSTEM FOR CARGO HANDLING

This invention relates to cargo handling apparatus and more particularly to such an apparatus employing rollers which can alternatively either be raised for use in rolling cargo into position or lowered so the rollers are retracted below the level of a loading platform.

Roller rail assemblies are commonly used for loading cargo. Such a system is described in U.S. Pat. No. 4,462,493 issued July 31, 1984 and assigned to Ancra Corporation, the assignee of the present application. Such roller rail cargo loading systems have been developed employing pneumatically actuated bladders or bags which can be inflated to raise the rollers about the level of the loading platform for use in loading cargo and deflated when desired to retract the rollers below the level of the platform surface so the rollers are not in use. Such a system is described in U.S. Pat. No. 4,089,399. This type of system enables the use of the loading surface in loading cargo which is generally on pallets, by rolling such pallets into position or in the alternative retracting the rollers and loading the pallets in position by means of a forklift truck or the like. With such retractable roller systems, it is necessary to periodically remove the roller and inflatable bladder devices for cleaning, maintenance, and on occasion replacement. It has been found that in the prior art devices, such removal is somewhat difficult and time consuming. The system of the present invention overcomes such shortcomings of the prior art in providing a structure which enables the rapid and easy removal of the system components for maintenance and repair, and yet, at the same time, affords firm holding action between these components while the rollers are in their raised operable positions.

This improved end result is achieved in the system of the present invention by employing flanges which extend inwardly from the side walls of a main channel in which the rollers are mounted and flanges extending outwardly from the side walls of a roller tray in which the rollers are rotatably supported. The flanges on one side of the roller tray and the main channel are offset from the flanges on the opposite side such that the roller tray can be tilted with the bladder deflated to enable easy removal of the tray from the channel.

It is therefore an object of this invention to facilitate the removal of the components of a retractable roller system for maintenance and repair.

It is a further object of this invention to provide a retractable roller system utilizing a pneumatically actuated bladder in which the roller tray and air bladder can be easily removed from the main channel in which they are mounted.

Other objects of the invention will become apparent as the description proceeds in connection with the accompanying drawings of which:

FIG. 1 is an end perspective view of a preferred embodiment of the invention;

FIG. 2 is an exploded view of the preferred embodiment;

FIG. 3 is a cross sectional view taken along the plane indicated by 3—3 in FIG. 1 showing the bladder in the non-inflated condition;

FIG. 4 is a cross sectional view showing the bladder in the inflated condition;

FIGS. 5 and 6 are a series of views illustrating the removal of the roller tray from the support channel;

Figure 7:
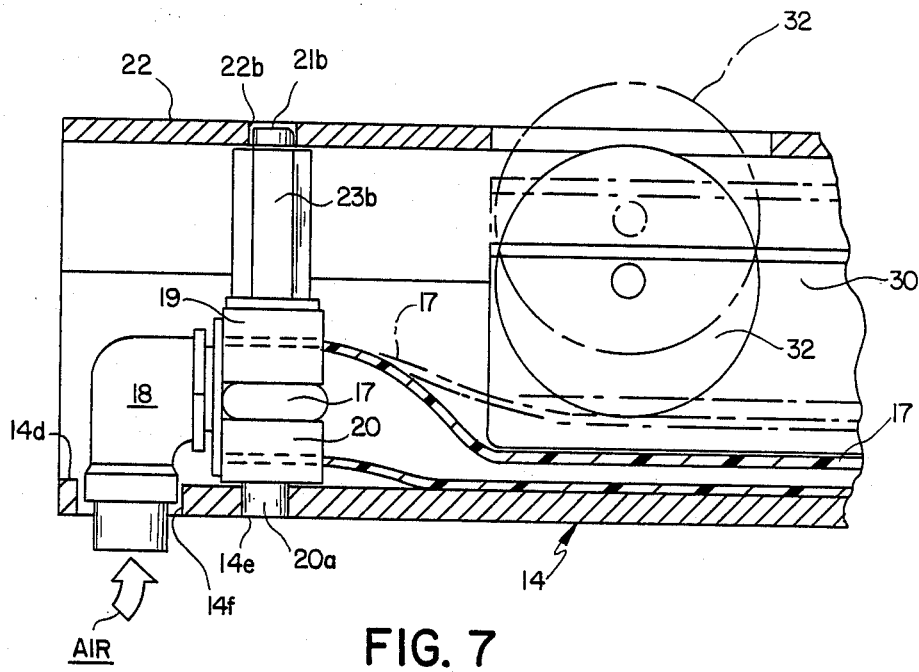
FIG. 7 is a cross sectional view taken along the plane indicated by 7—7 in FIG. 1.

Referring now to FIGS. a preferred embodiment of the invention is illustrated. Main channel member 14 has a bottom wall 14d and a pair of opposing side walls 14b and 14c. Main channel member 14 is supported on the frame or floor of a vehicle by means of mounting clips 15 which engage ridge portion 14a of the channel, the clips being attached to the vehicle frame or floor by means of bolts 16 which fit through apertures 15a formed in the clips. Channel 14 has a first ledge 14h extending inwardly and normally from one of the side walls thereof and a second ledge 14g extending inwardly and normally from the other of the side walls thereof, the second ledge being at higher elevation than the first ledge. Inflatable bladder 17 is supported on the bottom wall 14d of the channel, an air inlet nozzle 18 being connected to the air inlet of the bladder.

The ends of bladder 17 are sandwiched between a pair of plates 19 and 20, which have grooved portions in the center thereof to accommodate nozzle 18 which fits through aperture 14f in channel member 14. Studs 23a and 23b are fixedly attached to the top wall of plate 19. These studs have knobs 21a and 21b formed on the tops thereof which fit into apertures 22a and 22b formed in cover plate 22. Plate 20 has a pair of similar knobs 20a which extend from the bottom surface thereof and which matingly fit within apertures 14e formed in the bottom wall portion 14d of channel 14. Cover plate 22 is attached to the top edges of channel 14 by means of screws 25. With cover plate 22 so attached, the side edges of bladder 17 are clamped between plates 19 and 20 with the bladder being held in position in the channel by virtue of the retention of knobs 21a and 21b within apertures 22a and 22b and knobs 20a within apertures 14e.

Roller tray 30 has a plurality of roller members 32 rotatably supported between the opposing walls 30a and 30b thereof. Wall 30a has a ledge 31a extending outwardly and normally therefrom along the bottom edge thereof while wall 30b has a ledge 31b extending outwardly and normally therefrom at a location therealong spaced between the top and bottom edges thereof. A top cover plate 37 is removably attached to the top edges of channel 14 by means of screws 48. Rectangular apertures 42 are formed in plates 22 and 37 to accommodate each of rollers 32 so that they are free to fit therethrough when the bladder is in the inflated condition as shown in FIG. 4.

With the bladder deflated as shown in FIG. 3, the roller tray rests on the deflated bladder 17 with the rollers 32 recessed below the outer surfaces of cover plates 22 and 37. With bladder 17 inflated as shown in FIG. 4, roller tray 30 is driven upwardly until the ledges 31a and 31b thereof abut against ledges 14g and 14h of the channel, respectively. In this position, rollers 32 protrude above the surfaces of plates 22 and 37 so that they are accessible to provide the desired rolling action of a pallet thereon. In this position, the ledges, in conjunction with the pneumatic force provided to bladder 17, operate to retain the roller tray in the elevated position of FIG. 4.

When it is necessary to remove the bladder assembly or roller tray for repair or replacement, this can easily be done by first removing cover plates 22 and 37, and, with the bladder 17 deflated successively tilting roller tray 30 as shown in FIGS. 5 and 6 such that this tray can be removed from the channel with the ledges 31a and 14g and 31b and 14h clearing each other to enable such removal.

Figure 8:
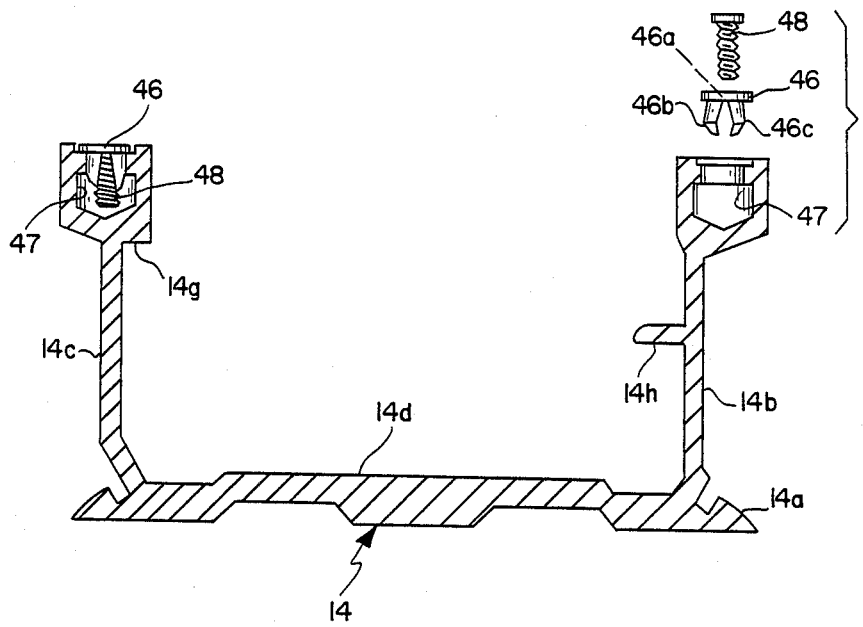
FIG. 8 illustrates an attachment assembly which may be used in attaching the cover plates to the roller tray.

Referring now to FIG. 8 an assembly for facilitating the removable attachment of the cover plates 22 & 37 to the top edge of the roller tray is shown. Plastic inserts 46 have a pair of resilient legs 46b and 46c which are pressed into mating apertures 47 formed in the edge of channel 14 in a snap-tight fit. The cover plates 22 and 37 are attached to the channel by means of screws 48 which threadably engage the threaded centers 46a of the inserts. If the threads of the inserts should become worn with continued use, the inserts can readily be replaced.

While the invention has been described and illustrated in detail, it is to be clearly understood that this is intended by way of illustration and example only and is not to be taken by way of limitation, the spirit and scope of the invention being limited only by the terms of the following claims.

I claim:

1. A retractable roller system for handling cargo comprising:

a main channel member having a bottom wall and first and second opposing side walls, a ledge running along the inner surface of each of said side walls, the ledge of said second side wall being at a higher elevation than the ledge of said first side wall, an inflatable bladder supported on the bottom wall of said channel member, a roller tray member having a bottom wall and first and second opposing side walls, a ledge running along the outer surface of each of said roller tray member side walls, the ledge of said second side wall being at a higher elevation than the ledge of said first side wall, a plurality of rollers rotatably supported between the side walls of the roller tray member, cover plate means, means for removably attaching said cover plate means to the top edges of the side walls of said main channel member directly opposite the bottom wall of said main channel member, said cover plate means having a plurality of apertures formed therein through which at least a portion of each of said rollers can pass; and means for inflating said bladder such that said bladder drives said roller tray member upwardly to cause said rollers to protrude through the apertures in the cover plate means, the ledges of the first side walls of said main channel member and said roller tray member and the ledges of the second side walls of said main channel member and said roller tray member abutting against each other respectively, thereby arresting upward movement of said roller tray member at a predetermined position, said roller tray member being tiltably removable from said main channel member when the bladder is deflated and said cover plate means is removed.

2. The retractable roller system of claim 1 wherein said ledges all run in a direction substantially normal to their respective side walls.

3. The retractable roller system of claim 1 and further comprising a pair of plates between which one end of said bladder is sandwiched and stud means extending between one of said plates and said cover plates means for holding said bladder in position in said channel.

4. The retractable roller system of claim 1 wherein said means for removably attaching said cover plate means to the top edges of the side walls of said main channel member comprises a plurality of snap-in inserts, said side wall edges having apertures formed therein adapted to receive said inserts, said inserts being snapped into said apertures, said cover plate means having apertures formed therein, and screw means fitted through the apertures in said cover plate means and threadably engaging said inserts for retaining the cover plate means to the main channel member.

* * * * *